(12) United States Patent
Chung et al.

(10) Patent No.: US 8,023,427 B2
(45) Date of Patent: Sep. 20, 2011

(54) METHOD AND DEVICE OF MEASURING COMMUNICATION QUALITY FOR CONSTRUCTING WIRELESS SENSOR NETWORK

(75) Inventors: Tae-Yun Chung, Gangneung-si (KR); Dae-Il Kim, Gangneung-si (KR)

(73) Assignee: Gangneung-Wonju National University Academy Cooperation Group, Gangneung-Si, Gangwon-Do (KR)

( * ) Notice: Subject to any disclaimer, the term of this patent is extended or adjusted under 35 U.S.C. 154(b) by 0 days.

(21) Appl. No.: 12/450,096

(22) PCT Filed: Jan. 10, 2008

(86) PCT No.: PCT/KR2008/000153
§ 371 (c)(1),
(2), (4) Date: Sep. 11, 2009

(87) PCT Pub. No.: WO2008/120857
PCT Pub. Date: Oct. 9, 2008

(65) Prior Publication Data
US 2010/0027434 A1 Feb. 4, 2010

(30) Foreign Application Priority Data

Mar. 29, 2007 (KR) .................. 10-2007-0030760
Jul. 23, 2007 (KR) .................. 10-2007-0073374

(51) Int. Cl.
*G01R 31/08* (2006.01)
(52) U.S. Cl. ......... 370/252; 370/321; 370/337; 370/442
(58) Field of Classification Search .................. 370/254, 370/251, 406, 232–233, 252–253, 255–256, 370/332–344, 321–327, 442–444
See application file for complete search history.

(56) References Cited

U.S. PATENT DOCUMENTS

| 2005/0226196 A1* | 10/2005 | Suh .............................. 370/338 |
| 2006/0120339 A1* | 6/2006 | Akiyama et al. ............... 370/338 |
| 2007/0025274 A1* | 2/2007 | Rahman et al. ............... 370/254 |

FOREIGN PATENT DOCUMENTS

| KR | 1020000060613 A | 10/2000 |
| KR | 1020030015791 A | 2/2003 |
| KR | 1020040100701 A | 12/2004 |
| KR | 1020050101065 A | 10/2005 |
| KR | 1020060127168 A | 12/2006 |

* cited by examiner

*Primary Examiner* — Pao Sinkantarakorn
*Assistant Examiner* — Iqbal Zaidi
(74) *Attorney, Agent, or Firm* — The Nath Law Group; Jerald L. Meyer; Stanley N. Protigal

(57) ABSTRACT

Provided is a communication quality measurement method and a portable communication quality measurement device for wireless sensor network configuration. The communication quality measurement method for wireless sensor network configuration includes: a portable communication quality measurement device transmitting a communication quality detection request message to one or more of communication nodes in a wireless sensor network system at a location prepared for new installation; the one or more of the communication nodes in the wireless sensor network system receiving the communication quality detection request message to detect transmission quality information on the communication quality detection request message and adding the detected transmission quality information to a respond message to transmit the respond message to a next communication node; and the portable communication quality measurement device receiving the respond message transceived between the communication nodes to detect reception quality information and displaying the detected reception quality information and transmission quality information included in the respond message.

7 Claims, 5 Drawing Sheets

[Fig. 1]
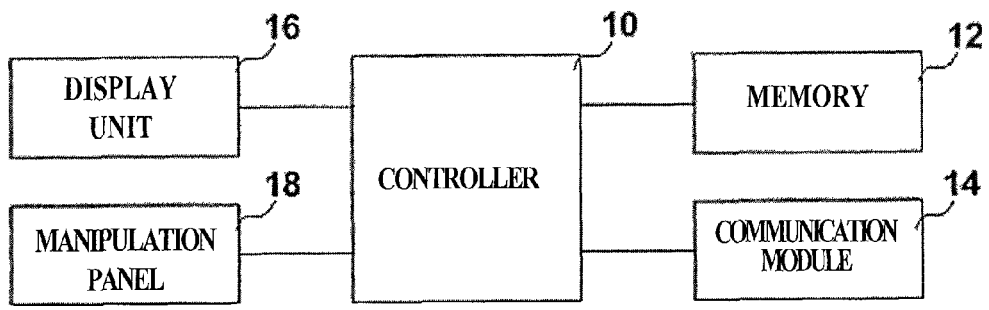
[Fig. 2]
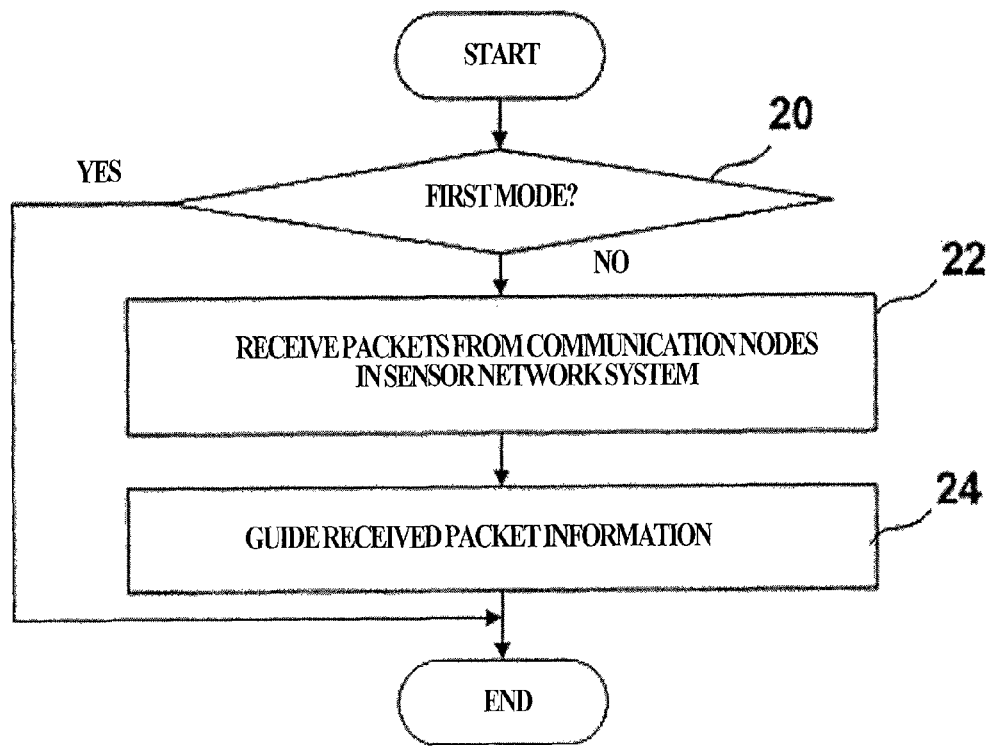

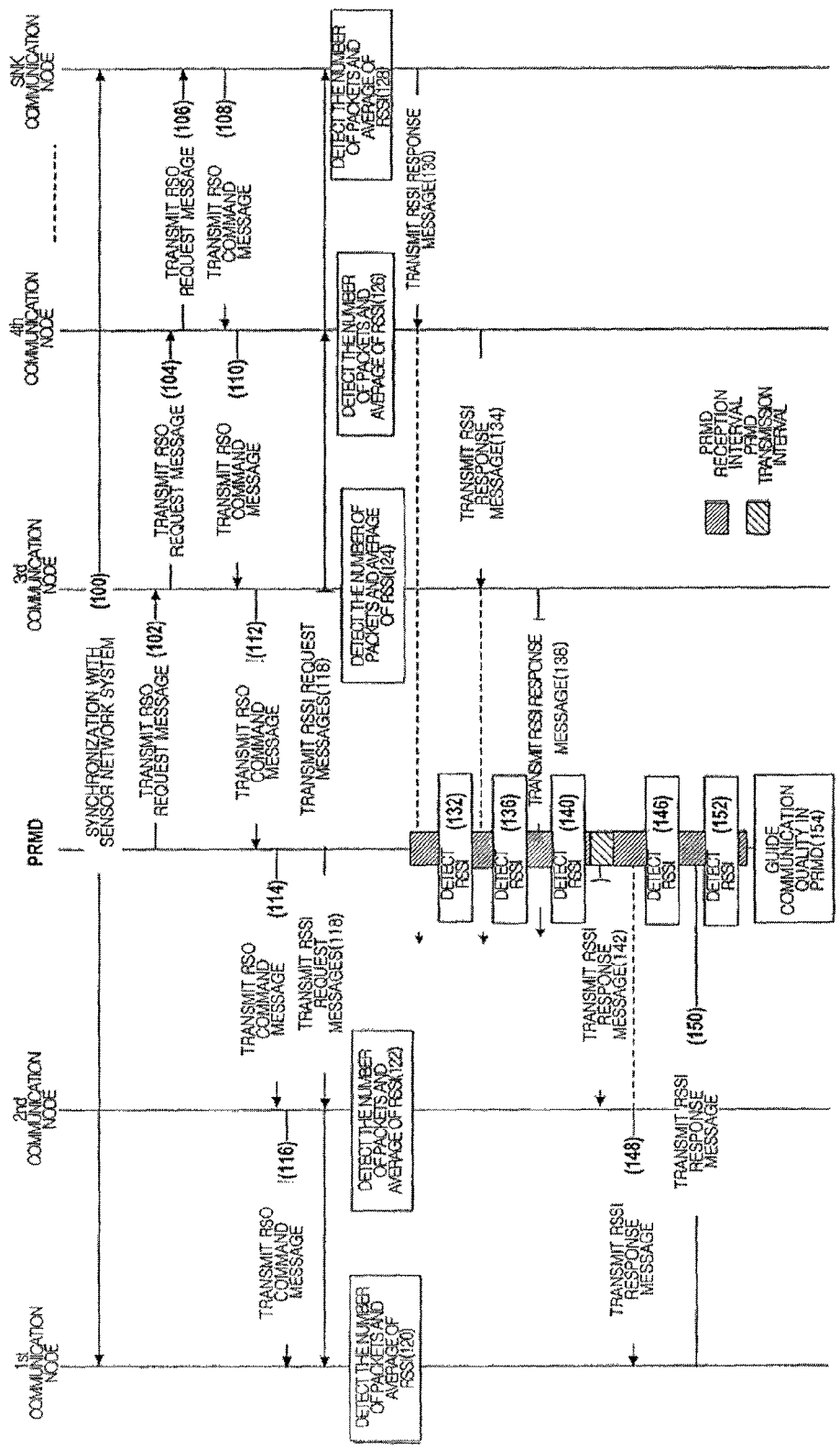
[Fig.3]

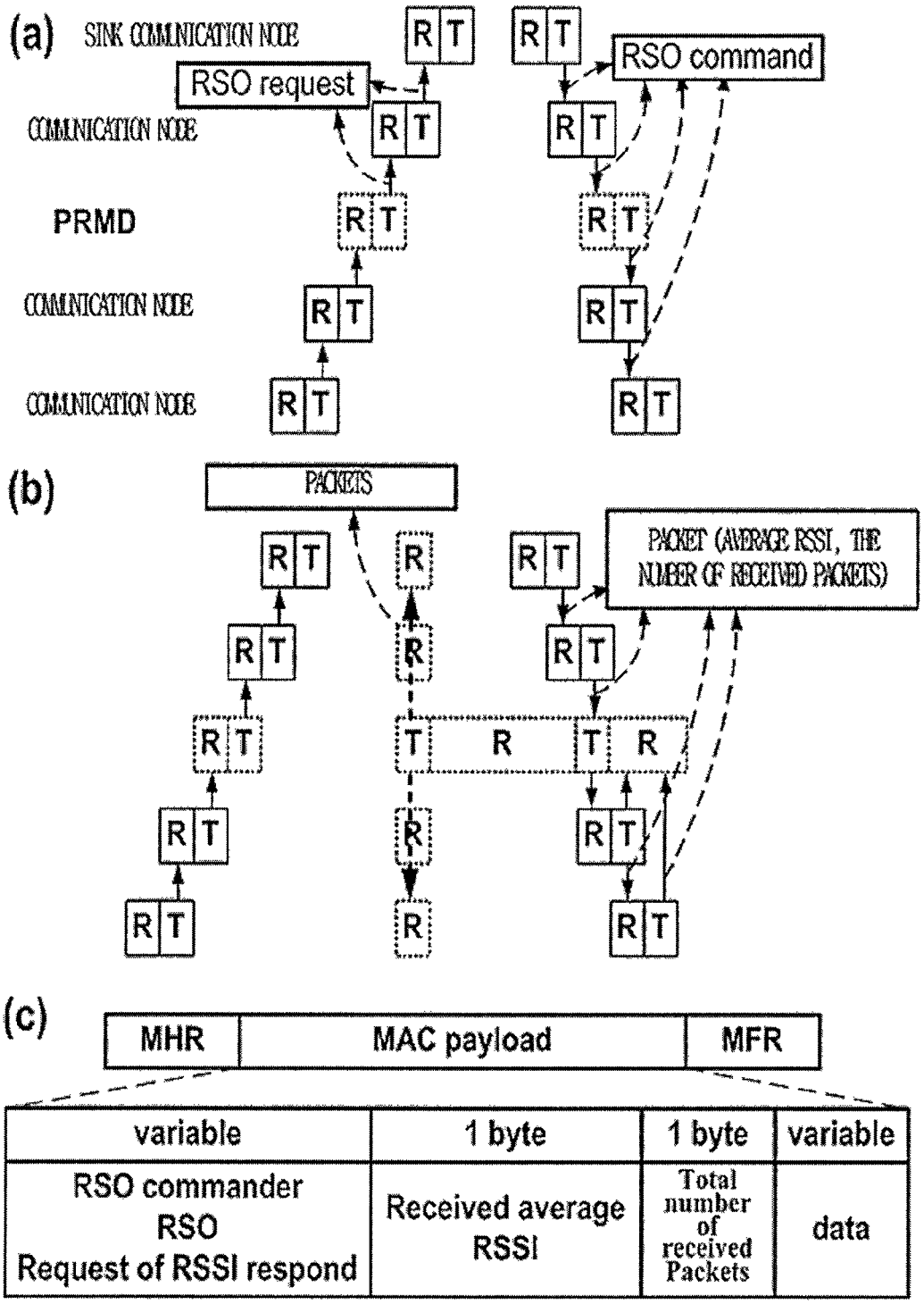

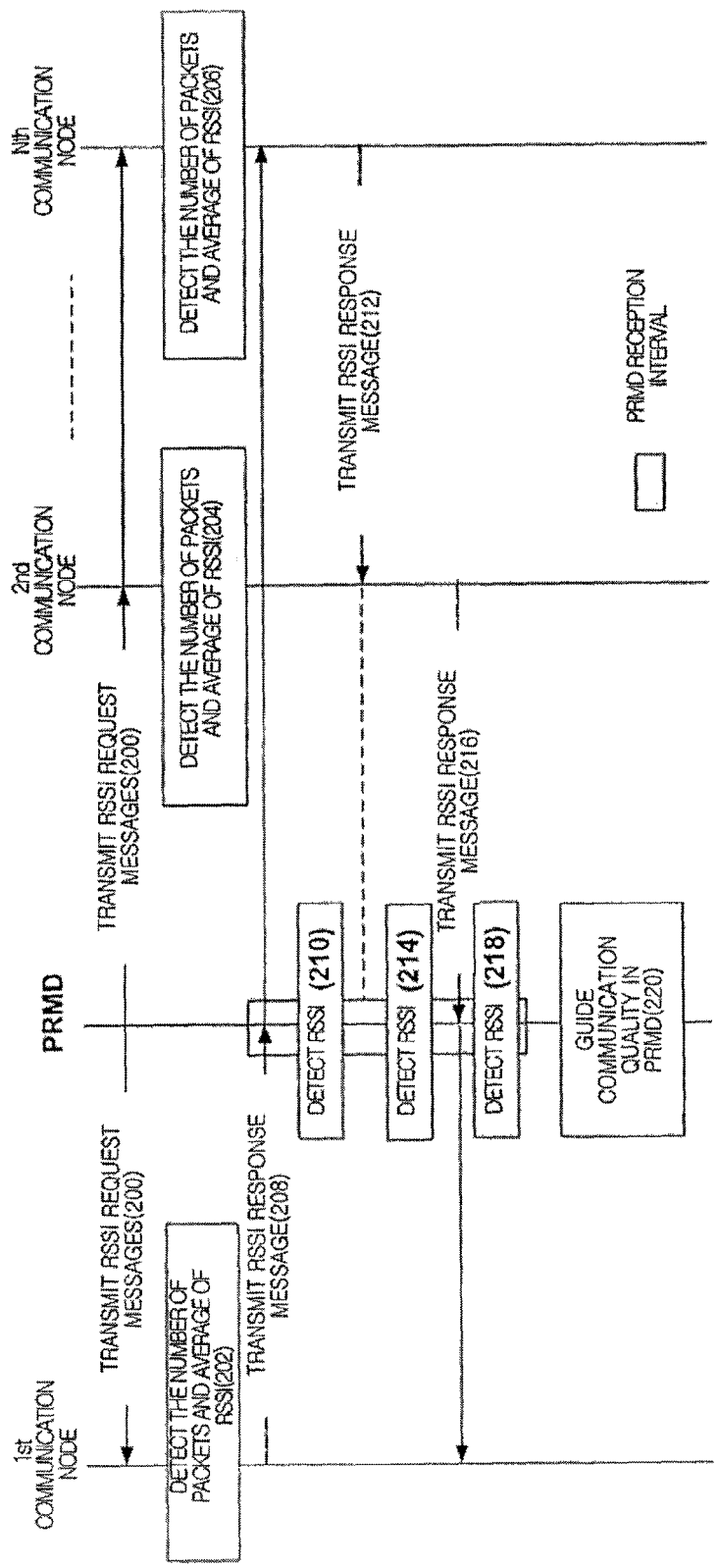
[Fig.5]

[Fig.6]
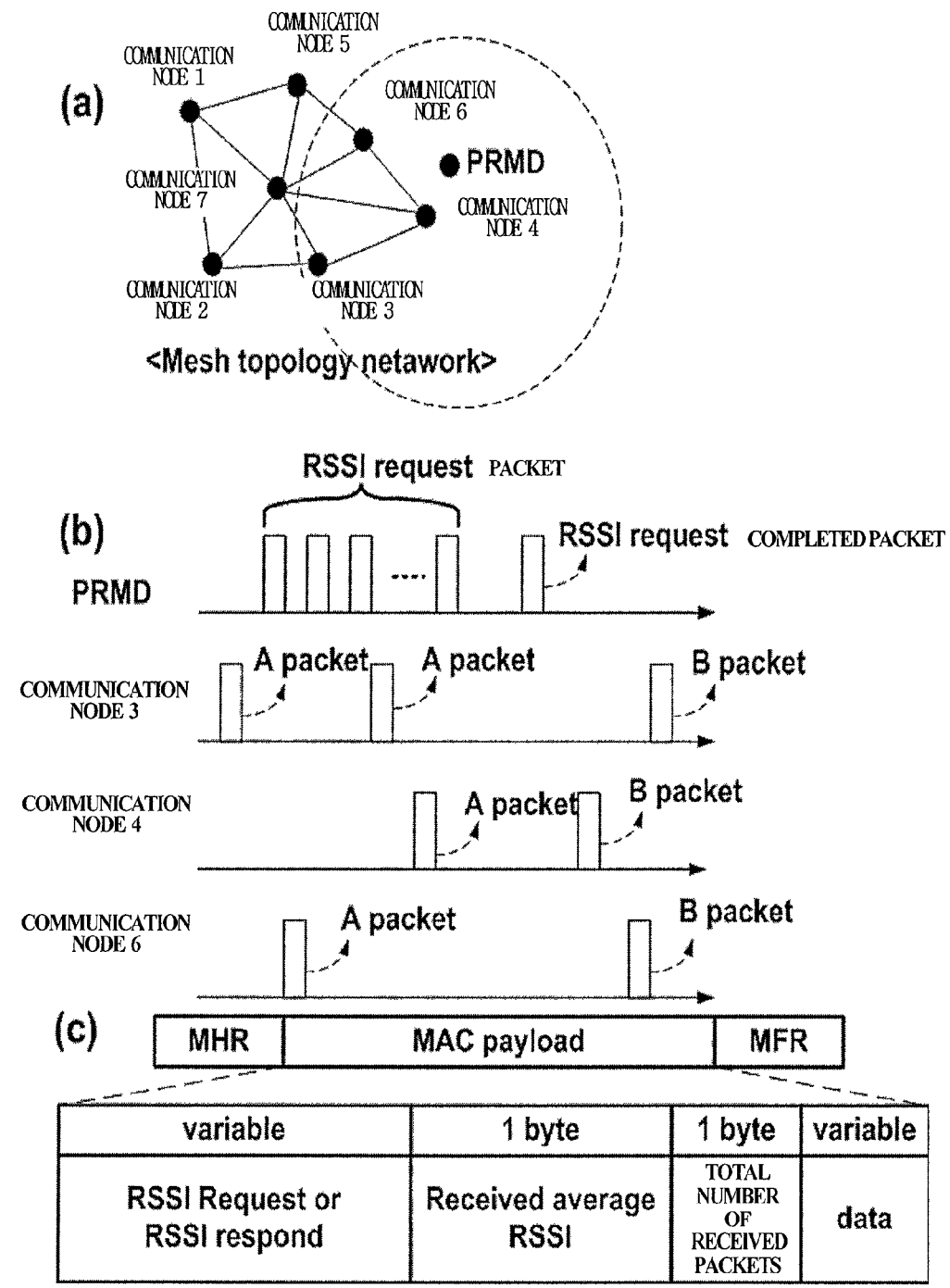

METHOD AND DEVICE OF MEASURING COMMUNICATION QUALITY FOR CONSTRUCTING WIRELESS SENSOR NETWORK

This is a National Phase Application filed under 35 USC 371 of International Application No. PCT/KR2008/000153, filed on Jan. 10, 2008, which claims foreign priority benefit under 35 USC 119 of Korean Application No. 10-2007-0030760, filed on Mar. 29, 2007, and which claims foreign priority benefit under 35 USC 119 of Korean Application No. 10-2007-0073374, filed on Jul. 23, 2007, the entire content of each of which is hereby incorporated herein by reference in its entirety.

TECHNICAL FIELD

The present invention relates to a wireless sensor network system, and more particularly, to a communication quality measurement method and a portable communication quality measurement device for wireless sensor network configuration.

BACKGROUND ART

In general, in order to install a new communication node of a new base station or a device in a wireless sensor network system, only a received signal strength indication (RSSI) of the communication node measured at a corresponding installation location is considered. As described above, conventionally, since only the RSSI of the communication node is considered to install the new communication node in the wireless sensor network system, in some cases, the corresponding installation location may not be appropriate for a communications network of the communication node. For example, in a communication environment with a high RSSI but a low transmitted signal strength indication, normal communications with the newly installed communication node cannot be normally performed.

DISCLOSURE

Technical Problem

The present invention provides a portable communication quality measurement device capable of detecting communication quality information on a communication node by directly transceiving data with the communication node.

The present invention also provides a communication quality measurement method for wireless sensor network configuration, capable of detecting communication quality information on a communication node at a location prepared for installing a new communication node, by using the portable communication quality measurement device and accurately determining suitability of the installation location of the new communication node.

Technical Solution

According to an aspect of the present invention, there is provided a communication quality measurement method for wireless sensor network configuration including: a portable communication quality measurement device transmitting a communication quality detection request message to one or more of communication nodes in a wireless sensor network system at a location prepared for new installation; the one or more of the communication nodes in the wireless sensor network system receiving the communication quality detection request message to detect transmission quality information on the communication quality detection request message and adding the detected transmission quality information to a respond message to transmit the respond message to a next communication node; and the portable communication quality measurement device receiving the respond message transceived between the communication nodes to detect reception quality information and displaying the detected reception quality information and transmission quality information included in the respond message.

ADVANTAGEOUS EFFECTS

Communication quality of a communication node can be measured by using the portable communication quality measurement device at a location prepared for installing a new communication node. Therefore, by practically measuring the communication quality at the location prepared for installing the new communication node, suitability of the corresponding location prepared for installation can be accurately determined.

According to the present invention, communications between the portable communication quality measurement device and the communication node are performed at the location prepared for installing the new communication node, and the communication quality during the communications can be detected, so that a communication environment of the location prepared for installing the new communication node can be accurately recognized.

DESCRIPTION OF DRAWINGS

FIG. 1 is a view illustrating a configuration of a portable communication quality measurement device according to an embodiment of the present invention;

FIG. 2 is a flowchart of operations of a portable communication quality measurement device in a first mode according to an embodiment of the present invention;

FIG. 3 is a flowchart of operations of a portable communication quality measurement device in a second mode according to an embodiment of the present invention;

FIG. 4 is a view schematically illustrating operations of a wireless sensor network system in a linear time division multiple access (TDMA) scheme in the second mode of the communication quality measurement device and a packet structure according to the present invention;

FIG. 5 is a flowchart illustrating operations in a third mode according to an embodiment of the present invention;

FIG. 6 is a view schematically illustrating operations of a wireless sensor network system in a mesh carrier sense multiple access (CSMA) scheme in the third mode of the communication quality measurement device and a packet structure according to the present invention.

BEST MODE

A portable received signal strength indication (RSSI) measurement device (PRMD) performs a communication quality detection process at a corresponding location prepared for installation according to an embodiment of the present invention. The PRMD according to the embodiment of the present invention operates in a first mode for guiding communication quality of packets transceived between communication modules in a wireless sensor network system, a second mode for measuring transception quality of the communication modules in the wireless sensor network system in a linear time division multiple access (TDMA) scheme, and a third mode for measuring transception quality of the communication modules in the wireless sensor network system in a mesh carrier sense multiple access (CSMA) scheme.

A configuration of the PRMD according to the present invention is described with reference to FIG. 1. The PRMD includes a controller 10, a memory 12, a communication module 14, a display unit 16, and a manipulation panel 18. The controller 10 operates in the first to third modes to measure communication quality of the wireless sensor network system according to the embodiment of the present invention. The memory 12 stores various types of information including a processing program for the controller 10, transceived packets, and the like. The communication module 14 communicates with communication nodes in the wireless sensor network system according to control of the controller 10. The display unit 16 displays the information according to the control of the controller 10. The manipulation panel 18 is a keypad or a touch screen and receives commands or information from a user to provide the received information to the controller 10. Now, operations of the PRMD are described according to the modes.

<First Mode-Monitoring of Communication Quality Between Communication Nodes in Sensor Network System>

Operations of the PRMD in the first mode are described with reference to FIG. 2. The controller 10 of the PRMD checks whether or not the first mode is requested from the user through the manipulation panel 18 (operation 20). When the first mode is requested, the controller 10 receives packets transceived between the communication nodes in the sensor network system at a current location (operation 22). Here, the packet has identification information on the transceived communication nodes, practical data such as sensing data, and the like. The controller 10 measures RSSIs of the received packets that are transceived between the communication nodes in the sensor network system, and displays the RSSI measured for each packet, transception communication nodes, the practical data, and the like on the display unit 16, so that the user can monitor the communication quality and a communication state between the communication nodes in the sensor network system at the current location of the PRMD.

<Second Mode-Communication Quality Measurement for Wireless Sensor Network Configuration in Linear TDMA Scheme>

First, an example applied to the wireless sensor network system in the linear TDMA scheme is described with reference to FIGS. 3 and 4. When the second mode according to the present invention is opened, the PRMD performs synchronization with the wireless sensor network system in the linear TDMA scheme and configures upper and lower communication nodes and time slots (operation 100).

When the synchronization between the PRMD and the wireless sensor network system in the linear TDMA is completed, the PRMD transmits to all communication nodes Rx slot open (RSO) request messages for requesting all of the communication nodes to maintain a reception mode so that all of the communication nodes in the wireless sensor network system can receive communication quality detection request messages (hereinafter, referred to as RSSI request messages) during a predetermined time interval (operation 102), and the RSO request messages are transmitted to a sink communication node through a linear path (operations 104 and 106). When the RSO request message is received to the sink communication node as illustrated in FIG. 4a, the sink communication node transmits, to lower nodes including the lowest node through the linear path, RSO command messages for commanding the lower nodes to maintain the reception mode for the predetermined time interval (operations 108 to 116). Here, the communication nodes receiving the RSO command messages maintain the reception mode for a corresponding time interval. Transception operations of the RSO request messages and the RSO command messages as described above are illustrated in FIG. 4a.

Thereafter, the PRMD transmits a predetermined number of RSSI request messages during the predetermined time interval to all of the communication nodes in the wireless sensor network system as illustrated in FIG. 4b (operation 118). All of the communication nodes in the wireless sensor network receive the RSSI request messages during the time interval, and when the time interval is ended, the communication nodes detect the number of the received RSSI request messages, an RSSI of each of the RSSI request messages, and average value of the detected RSSIs and generates the detected data as transmission quality information (operations 120 to 128).

Thereafter, the sink communication node in the wireless sensor network system inserts the transmission quality information into a respond message in response to the RSSI request message and transmits the respond message to lower communication nodes (operation 130). Here, the PRMD operates in a reception mode until a transmission interval of the PRMD is started after the predetermined time interval and receives the respond message that is transmitted from the sink communication node to the lower communication nodes (operation 130). The PRMD detects the RSSI in the response message received from the sink communication node and temporarily stores the RSSI of the respond message transmitted from the sink communication node and transmission quality information included in the respond message, as reception quality information on the sink communication node of the PRMD and transmission quality information on the sink communication node of the PRMD, respectively (operation 132).

A lower communication node transmits a respond message including the transmission quality information to a lower communication node by receiving the respond message from the sink communication node (operation 134). Here, the PRMD operates in the reception mode until the transmission interval of the PRMD is started after the predetermined time interval to receive the respond message transmitted from the communication node to the lower communication node (operation 134). The PRMD detects an RSSI in the respond message received from the communication node and temporarily stores the RSSI in the respond message received from the communication node and transmission quality information included in the respond message, as reception quality information on a corresponding communication node of the PRMD and transmission quality information on the corresponding communication node of the PRMD, respectively (operation 136). As described above, the operation of detecting and storing the transception quality information by receiving the respond message is continued until the transmission interval of the PRMD is started.

When the transmission interval of the PRMD is arrived, the PRMD operates in a transmission mode, and the PRMD transmits a respond message corresponding to the respond message received from the upper communication node to the lower communication node (operation 142). The lower communication node transmits a respond message including the transmission quality information to the lower communication node by receiving the respond message (operation 148). Here, when the transmission interval of the PRMD is finished, the PRMD operates in the reception mode until a transmission interval of the lowest communication node is finished, in order to receive the respond message transmitted from the lower communication node. The PRMD detects an RSSI in the respond message transmitted from the communication node and temporarily stores the RSSI in the respond message received from the communication node and transmission quality information included in the respond message as the reception quality information on the corresponding mode of the PRMD and the transmission quality information on the corresponding communication node of the PRMD, respectively (operation 146). As described above, the operations of detecting and storing the transception quality information by receiving the respond message are continued until the transmission interval of the lowest node is finished (operations 150 and 152).

After the operation of storing the transmission quality information and the reception quality information on the lowest node is completed, the PRMD displays the transmission quality information and the communication quality information that is the reception quality detection information on all of the communication nodes in the wireless sensor network system in the linear TDMA scheme, on the display unit (operation 154).

An installer installs a new communication node after checking whether or not a corresponding location prepared for installation is proper on the basis of the displayed communication quality information on all of the communication nodes. Here, by considering the communication quality information on all of the communication nodes, the new communication node can be installed at a location where communications between a number of communication nodes are properly performed. Therefore, even if a communication node is in error, the wireless sensor network system in the linear TDMA scheme can be normally operated.

A packet transceived between the communication nodes illustrated in FIG. 4c. A payload of the packet (referred to as MAC payload) includes message identification information on an RSO instruction, an RSO request, an RSSI response, and the like and data including transmission quality information such as an RSSI average value, the total number of received packets, and the like. In addition, the communication quality information is displayed according to the communication nodes, so that a communication environment for the location prepared for installation can be easily recognized.

<Third Mode-Communication Quality Measurement for Wireless Sensor Network Configuration in Mesh CSMA>

Now, a communication quality measurement method used in the wireless sensor network system in a mesh CSMA scheme is described with reference to FIGS. 5 and 6.

When a communication environment detection process according to the present invention is opened, the PRMD broadcasts a predetermined number of RSSI request messages to communication nodes in a radio frequency (RF) power coverage as illustrated in FIG. 6a (operation 200).

When the communication nodes receive an RSSI request complete message from the PRMD, each of the communication nodes that receives a number of the RSSI request messages detects the number of the received RSSI request messages, an RSSI of each of the RSSI request messages, an average value of the detected RSSIs and generates the values as transmission quality information. Each of the nodes inserts the transmission quality detection information into an RSSI respond message and transmits the RSSI respond message to anther communication node as illustrated in FIG. 6b (operations 208, 212, and 216).

The PRMD maintains the reception mode for a predetermined time and receives RSSI respond messages transceived between the communication nodes. In addition, whenever the RSSI respond message is received, the PRMD detects an RSSI of the received RSSI respond message, that is, reception quality information (operations 210, 214, and 218). Thereafter, on the basis of the transmission quality information included in the RSSI respond messages received from the communication nodes in the wireless sensor network system in the mesh CSMA scheme and the reception quality information on the RSSI detected by using the RSSI respond message, the PRMD displays communication quality information on each of the communication nodes (operation 220).

The installer determines whether or not the new communication node is to be installed at the corresponding location prepared for installation on the basis of the communication quality information on each communication node in the wireless sensor network system displayed by using the PRMD.

In addition, a packet transceived between the communication nods is as illustrated in FIG. 6c. A payload of the packet (referred to as MAC payload) includes message identification information on RSSI requests, RSSI responses, and the like and data including transmission quality information such as an average value of the RSSIs, the total number of the received packets, and the like. In addition, the communication quality information is displayed according to the communication nodes, so that a communication environment on the installation location can be easily perceived.

A communication process of the wireless sensor network system according to the embodiment of the present invention is described briefly. The PRMD starts a process of detecting a communication environment of a location prepared for installation according to the embodiment of the present invention at the location prepared for installation. When the process of detecting the communication environment is started, the PRMD transmits one or more communication quality detection request messages to communication nodes in the wireless sensor network system.

The communication node that receives the one or more communication quality detection request messages detects transmission quality information from the communication quality detection request messages and adds the detected transmission quality information to a respond message to transmit the respond message to a next communication node.

The PRMD receives the respond message transceived between the communication nodes, detects reception quality information from the received respond message, and displays the reception quality information from the detected respond message and transmission quality information included in the respond message on the display unit. The transmission quality information is one or more of the number of received communication quality detection request messages, an RSSI of each of the received communication quality request messages, and an average value of the RSSIs of the received communication quality request messages. In addition, the reception quality information is referred to as the RSSI detected from the respond message that is transceived between the communication nodes and received to the PRMD.

The installer determines whether or not the new communication node is to be installed at the corresponding location prepared for installation on the basis of communication quality information on each communication node in the wireless sensor network system displayed through the PRMD.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

The communication quality measurement method and the portable communication quality measurement device according to the present invention can be effectively used to configure a wireless sensor network or check a communication state of each sensor node.

The invention claimed is:

1. A method of measuring communication quality of wireless sensor network configuration, comprising steps of:
    by a portable communication quality measurement device, transmitting an RSO (Rx slot open) request message as a communication quality detection request message to one or more of communication nodes in a wireless sensor network system at a location prepared for new installation;
    by the sink communication node, transmitting an RSO command message to the communication nodes in the wireless sensor network system in response to the RSO request message;
    by the one or more of the communication nodes in the wireless sensor network system, receiving the communication quality detection request message to detect transmission quality information on the communication quality detection request message and adding the detected transmission quality information to a respond message to transmit the respond message to a next communication node; and
    by the portable communication quality measurement device, receiving the respond message transceived between the communication nodes to detect reception quality information and displaying the detected reception quality information and transmission quality information included in the respond message.

2. A method of measuring communication quality of wireless sensor network configuration in a linear TDMA (time division multiple access) scheme, comprising steps of:
    by a portable communication quality measurement device, transmitting an RSO (Rx slot open) request message for requesting communication nodes in a wireless sensor network system to maintain a reception mode for a predetermined time interval to a sink communication node through a linear path at a location prepared for new installation;
    by the sink communication node, transmitting an RSO command message to the communication nodes in the wireless sensor network system in response to the RSO request message;
    by the communication nodes in the wireless sensor network system, maintaining the reception mode for the predetermined time interval according to the RSO command message, and the portable communication quality measurement device transmitting a predetermined number of communication quality detection request messages to the communication nodes in the wireless sensor network system for the predetermined time interval;
    by the communication nodes in the wireless sensor network system, receiving the communication quality detection request message to detect the transmission quality information and transmitting a respond message including the transmission quality information along the linear path; and
    by the portable communication quality measurement device, receiving the respond message of the communication nodes transmitted along the linear path to detect the reception quality information and displaying the detected reception quality information and the transmission quality information included in the respond message.

3. The communication quality measurement method of claim 1,
    wherein the communication quality information includes one or more of the number of received transmission quality detection request messages, a received signal strength indication of each message, and an average value of the received signal strength indications of the messages, and
    wherein the transmission quality information is the received signal strength indication of the received respond message.

4. The communication quality measurement method of claim 1, wherein the transmission quality information and the reception quality information are displayed according to the communication nodes.

5. A portable communication quality measurement device for wireless sensor network configuration in a linear TDMA scheme, comprising:
    a communication module communicating with communication nodes in a wireless sensor network system;
    a display unit; and
    a controller functioning as a communication node in the wireless sensor network in the linear TDMA scheme at a location prepared for new installation, transmitting an RSO request message for requesting the communication nodes in the wireless sensor network to maintain a reception mode for a predetermined time interval to a sink communication node along a linear path, transmitting a predetermined number of communication quality detection request messages to the communication nodes in the wireless sensor network system during the predetermined time interval, receiving a respond message transmitted from the communication nodes in the wireless sensor network system to include transmission quality information in response to the communication quality detection request message along the linear path, and detecting reception quality information on the respond message and displaying the detected reception quality information and the transmission quality information included in the respond message on the display unit.

6. The portable communication quality measurement device of claim 5,
    wherein the communication quality information includes one or more of the number of received transmission quality detection request messages, a received signal strength indication of each message, and an average value of the received signal strength indications of the messages, and
    wherein the transmission quality information is the received signal strength indication of the received respond message.

7. The portable communication quality measurement device of claim 5, wherein the transmission quality information and the reception quality information are displayed according to the communication nodes.

* * * * *